C. L. McDONALD.
EMERGENCY BRAKE FOR VEHICLES.
APPLICATION FILED FEB. 10, 1920.
1,385,877.
Patented July 26, 1921.
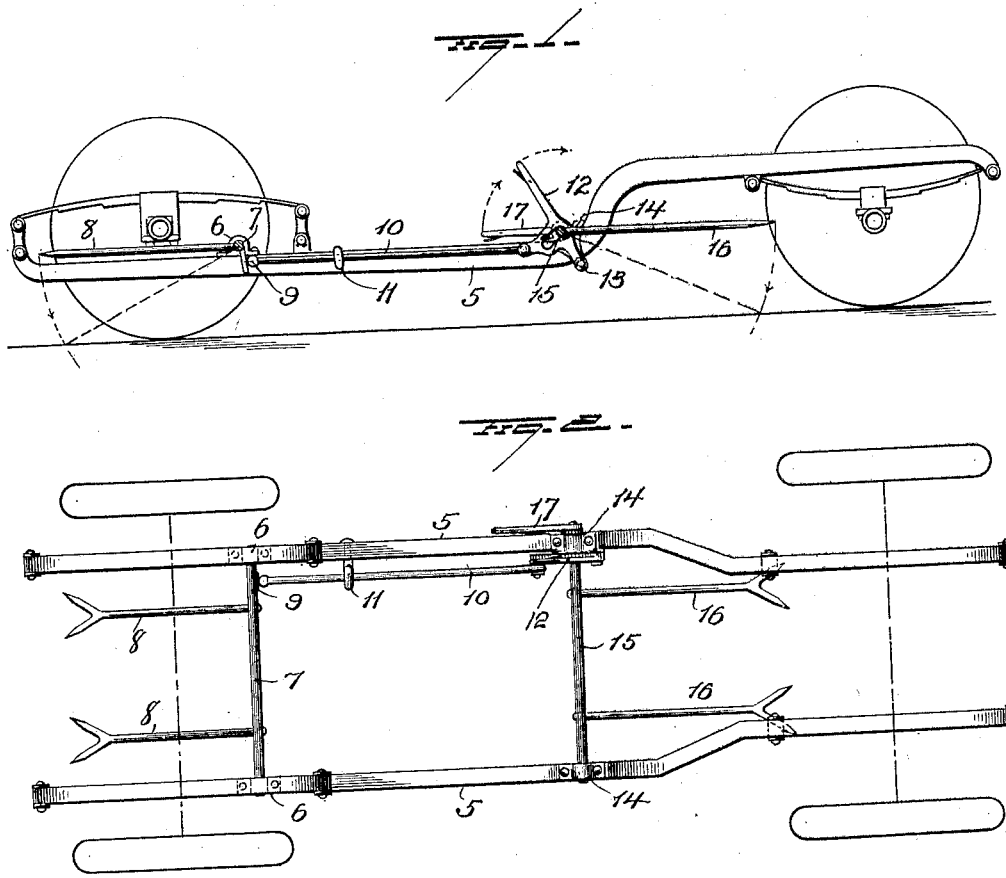

UNITED STATES PATENT OFFICE.

CATHARINE LETTIE McDONALD, OF CALDWELL, OHIO.

EMERGENCY-BRAKE FOR VEHICLES.

1,385,877.　　　　Specification of Letters Patent.　　Patented July 26, 1921.

Application filed February 19, 1920. Serial No. 357,641.

*To all whom it may concern:*

Be it known that I, CATHARINE LETTIE McDONALD, a citizen of the United States, and a resident of Caldwell, in the county of Noble and State of Ohio, have invented certain new and useful Improvements in Emergency-Brakes for Vehicles; and I do hereby declare the following to be a full, clear, and exact description of the invention, such as will enable others skilled in the art to which it appertains to make and use the same.

My invention relates to an improvement in emergency brakes for vehicles the object being to provide means particularly adapted for use on automobiles for bringing the car to a stop while ascending or descending grades in the event the regular brakes with which the car is equipped should fail to hold, and it consists in the details of construction and combinations of parts as will be more fully explained and pointed out in the claims.

In the accompanying; Figure 1 is a view in side elevation partly in section of the underframe of an automobile with my improvement applied thereto and Fig. 2 is a plan view of the same.

5 represents the underframe of an automobile, which may be of any approved form or construction, provided adjacent its rear end and preferably in front of the rear axle with bearings 6 in which the shaft 7 is mounted to turn. This shaft is provided with one or more rearwardly extending arms 8 forked at their free ends as shown, and of a length sufficient to rest on the ground in a vertical plane in rear of the shaft 7 when the latter is released and act as a chock or brake and prevent the machine from backing down a hill in the event the engine should stall and the regular brakes slip or fail to work properly, thus constituting an emergency brake. The shaft 7 is also provided adjacent one end with a depending projection 9, preferably in the form of a plate against which one end of the rod 10 bears. This rod is suitably mounted as at 11 for longitudinal movement and is connected at its front end with the lever 12 pivoted at 13 to the underframe of the car. Normally the free end of rod 10 bears against projection 9 and holds arms 8 up off the ground as shown in full lines, but by moving the lever 12 forwardly or in the direction of the arrow the rod 10 will be moved forwardly thus permitting shaft 7 to turn until the prongs contact with the ground as shown by dotted line in Fig. 1. As there is no positive connection between rod 10 and shaft 7, it follows that when the free ends of the arms 8 are lowered onto the ground they ride over the surface without interfering in the slightest with the forward movement of the vehicle, but absolutely prevent it from backing down hill in the event of the failure of the regular brake to hold it. By shifting lever 12 in the reverse direction the free end of the rod will be moved into contact with the depending projection 9 and thus turn shaft 7 in a direction to elevate the free ends of the arms 8 in which position they are normally held by the contact of rod 10 with the projection 9.

Journaled in bearings 14 on the underframe 5, in advance of shaft 7, is the shaft 15 which is provided with forwardly projecting arms 16 preferably forked at their free ends. Shaft 15 passes through an elongated slot in lever 12 and is provided at its end adjacent lever 12 with a lever 17 secured thereto and by which the shaft may be turned to lower or lift its arms 16. These arms are of such length and the shaft 15 so located that the free ends of the arms 16 will engage the surface of the ground in advance of the center of the machine and when lowered will act as a stop to forward movement in descending a hill in the event the regular brakes should fail to act. I prefer to have a direct connection between the lever 17 and shaft 15 so that the arm 16 cannot drop accidentally, and will be held substantially rigid when in its normal position as shown in full lines in Fig. 1.

With the aid of these auxiliary brakes or chocks at the front and rear of the machine, all danger of loss of control due to defective brakes will be avoided. In ascending a hill the rear arms can be dropped and trail on the ground without interfering in the slightest with the forward movement of the machine, but which will be in position to instantly check backward movement in the event anything should go wrong with the engine or transmission.

Having fully described my invention what I claim as new and desire to secure by Letters-Patent, is:—

1. In an emergency brake for vehicles, the combination of the underframe of the vehicle, two shafts pivotally mounted thereon one having arms projecting forwardly and the other having arms projecting rearwardly the free ends of said arms adapted when in operative position to engage the road bed and act as a chock for the vehicle, and independent means for actuating the said shafts to lower and raise the said arms, the actuating means for the rear arms having a loose connection with the latter whereby said arms are free to trail and ride over the surface of road when the machine is moving forwardly.

2. In an emergency brake for vehicles, the combination of the underframe of the vehicle, two shafts pivotally mounted thereon one having arms projecting forwardly and the other having arms projecting rearwardly the free ends of said arms adapted when in operative position to engage the road bed and act as a chock for the vehicle, and independent means for actuating the said shafts to lower or raise the arms, the means for actuating the rear arms having a loose connection with the latter whereby the said arms will be free to trail over the ground without imparting any movement to the actuating means.

3. In an emergency brake for vehicles, the combination of the underframe of a vehicle, a shaft pivotally carried thereon, brake arms rigidly secured to said shaft and projecting rearwardly therefrom, the free ends of said arms adapted to rest on the surface of the road when the shaft is released and means for actuating the shaft to lower or raise the arms, the actuating means for shaft actuating the same positively only in a direction to lift the shaft thus leaving the arms free to trail over the roadway when the brake is set.

4. In an emergency brake for vehicles, the combination of the underframe of a vehicle, a shaft pivotally carried thereon and having rearwardly projecting chock arms, a projection on said shaft and a longitudinally movable rod adapted to engage said projection for turning the shaft in a direction to raise the free ends of the arms, the said arms being free to trail on the roadway when the brake is set.

In testimony whereof, I have signed this specification in the presence of two subscribing witnesses.

CATHARINE LETTIE McDONALD.

Witnesses:
W. E. KEITH,
HAPPIE FORAKER.